Patented July 6, 1926.

1,591,712

UNITED STATES PATENT OFFICE.

HARRY F. LEWIS, OF BUFFALO, NEW YORK, ASSIGNOR TO NATIONAL ANILINE & CHEMICAL COMPANY, INC., OF NEW YORK, N. Y., A CORPORATION OF NEW YORK.

PURIFICATION OF ANTHRAQUINONE.

No Drawing.   Application filed March 4, 1920.   Serial No. 363,261.

This invention relates to the purification of anthraquinone, and more particularly to the purification of anthraquinone admixed with other oxidation products, such as the oxidation products of carbazol and other nitrogen bases and the carboxy and phenolic oxidation products of other hydrocarbons.

In the production of anthraquinone by oxidizing anthracene, for example, with a solution of chromic acid, or with an acid solution of sodium or potassium dichromate, such impurities as are admixed with the anthracene are subjected to the same oxidizing agent or agents as is the anthracene itself. As a result, the anthraquinone produced, after separating the constituents which are soluble in water or in the acid solution, contains various impurities in admixture therewith. The nature and amount of the impurities will vary somewhat with the method of production, and also with the purity of the anthracene used as the starting material for the oxidation. Thus, where the anthracene contains other hydrocarbons or nitrogenous bases admixed therewith, such as phenanthracene, fluorene, picene, acenaphthene, methylanthracene, pyrene, chrysene, retene, carbazol, etc., the anthraquinone produced will contain an unchanged anthracene or other hydrocarbons, and any oxidation products thereof, such as varying amounts of part or all of the following materials, namely, diphenic acid, carbazol and its oxidation products, other nitrogenous substances and their oxidation products, carboxy and phenolic oxidation products of hydrocarbons, etc. The purification of the impure anthraquinone accordingly involves separating the anthraquinone from such impurities.

The present invention is based upon the discovery that impure anthraquinone containing impurities of the character above referred to, can be purified and materially improved by extracting the crude or impure product, obtained in the usual way by the oxidation of anthracene with a chromic acid mixture, with an alkaline solution of suitable strength. The alkali used may be sodium, ammonium, or potassium hydroxide or the carbonates of these metals, or a weaker base such as barium hydroxide. The amount of the alkali will vary somewhat with the amount of impurity and with the particular alkali employed. The strength of the alkali solution can also be varied, from relatively dilute solutions to concentrated solutions. The purification is best effected at a temperature between about 50 and 100° C., but lower temperatures may be used. The impurities particularly removed by such alkaline treatment are those above indicated, namely, the oxidation products of carbazol and other nitrogen bases, as well as the carboxy and phenolic oxidation products of such hydrocarbons as methylanthracene, phenanthrene, acenaphthene, etc., and oxidation products which contain chromium as a constituent.

In the preferred practice of the invention, the crude anthraquinone is extracted with hot alkaline solution in amount from about five to ten times the weight of the anthraquinone, and the resulting solution is filtered while still hot from the undissolved anthraquinone and from alkali insoluble impurities. The purified anthraquinone thus obtained is then washed with an amount of hot alkaline solution about equal to the weight of the anthraquinone, and it is finely washed with water until it is free from alkali.

Where the anthraquinone is unusually impure, or where a product of increased purity is desired, the purification by extraction with alkali can be repeated one or more times until such impurities as have escaped extraction by the first treatment have been substantially removed.

The impurities which are thus extracted from the crude or impure anthraquinone may themselves be recovered for use or for further treatment by acidifying the alkaline filtrate thereby precipitating the impurities from solution. The impurities thus separated can be filtered off and thus recovered in a form adapted for use or for further treatment.

Various forms of apparatus can be used in the practice of the invention, but an ordinary wooden vat equipped with a stirrer and with steam pipes is well adapted for use. In the use of such an apparatus, the crude anthraquinone can be charged into the vat, together with the alkaline solution, and the temperature raised by means of the steam coils until the desired temperature is reached. This temperature is maintained, with agitation of the suspension, over a suitable period of time, for example, about one hour. The suspension is then filtered hot, and preferably as rapidly as possible.

The process of the present invention is applicable not only to the crude anthraquinone produced by the oxidation of anthracene with a chromic acid mixture, but also to the purification of commercial anthraquinone produced by other processes, or purified by other methods of purification, where it is still admixed with impurities of the character above referred to.

The invention will be further illustrated by the following specific examples, the parts being by weight:

Example 1.

Ten parts of crude anthraquinone produced from anthracene by oxidation with a chromic acid mixture, are boiled with one hundred parts sodium hydroxide solution, with agitation of the mixture until the impurities have been dissolved by the alkaline solution. The solution is then filtered, and the purified anthraquinone washed with alkali solution and then with water and dried. Crude anthraquinone can thus be materially improved in purity, and freed from a considerable portion of nitrogenous bases or their oxidation products, as well as from oxidation products which may contain chromium as a constituent. The alkaline filtrate is then acidified to precipitate the extracted impurities, and the impurities are recovered in this way.

Example 2.

Ninety parts of crude anthraquinone are agitated at 95° C. for one hour with one thousand parts of 5% caustic soda solution, the solution then filtered hot and the residue washed with water until the wash water is neutral. A high recovery of anthraquinone is thus obtained of materially increased purity.

I claim:

1. The method of purifying impure anthraquinone, which contains impurities of the type produced by oxidation of anthracene with chromic-sulfuric acid solution, which comprises subjecting said impure anthraquinone without preliminary treatment with sulfuric acid to extraction with a hot alkaline solution and separating the resulting solution of impurities from the undissolved purified anthraquinone.

2. The method of removing products of oxidation of nitrogen bases from impure anthraquinone containing impurities of the type produced by oxidation of impure anthracene with chromic-sulfuric acid solution which comprises subjecting the impure anthraquinone, without preliminary treatment with sulfuric acid, to extraction with an alkaline solution and separating the resulting solution of impurities from the undissolved purified anthraquinone.

3. The method of removing carboxy and phenolic products from impure anthraquinone containing impurities of the type produced by oxidation of anthraquinone with chromic-sulfuric acid solution which comprises subjecting the impure anthraquinone, without preliminary treatment with sulfuric acid, to extraction with an alkaline solution, and separating the resulting solution from the undissolved anthraquinone.

4. The method of separating oxidation products containing chromium as a constituent obtained by oxidizing impure anthracene by means of a chromic-sulfuric acid oxidizing mixture, which comprises subjecting impure anthraquinone without preliminary treatment with sulfuric acid containing such oxidation products to the action of an alkaline solution and separating the resulting solution from the purified anthraquinone.

5. The method of purifying impure anthraquinone containing impurities of the type produced by oxidation of anthracene with chromic-sulfuric acid solution which comprises subjecting the impure anthraquinone to extraction with a hot caustic soda solution, separating the hot solution from the undissolved purified anthraquinone, and washing the purified anthraquinone with a hot caustic soda solution, and finally with water until the product is substantially free from alkali.

6. The method of purifying impure anthraquinone containing impurities of the type produced by oxidation of anthracene with chromic-sulfuric acid solution which comprises subjecting the same to extraction with a hot caustic soda solution until part of the impurities are extracted therefrom, separating the hot solution from the partly purified anthraquinone, and repeating the extraction with further amounts of hot caustic soda solution to effect the extraction of further impurities therefrom.

7. The method of purifying crude anthraquinone containing impurities of the type produced by oxidation of anthracene with chromic-sulfuric acid solution from other oxidation products, including oxidation products of carbazol, which comprises heating the anthraquinone with about five to ten times its weight of a caustic alkali solution, agitating the crude anthraquinone with the hot alkaline solution for a considerable period of time to bring about solution of soluble impurities and filtering the resulting solution while still hot from the undissolved anthraquinone.

8. The method of purifying crude anthraquinone containing impurities of the type produced by oxidation of anthracene with chromic-sulfuric acid solution which comprises heating the crude anthraquinone with an alkaline solution without preliminary treatment with sulfuric acid, agitating the mixture and continuing the heating and agitation to bring about solution of soluble impurities, filtering the resulting solution from undissolved anthraquinone, and washing the anthraquinone with a further amount of alkali solution.

9. The method of purifying crude anthraquinone containing impurities of the type produced by oxidation of anthracene with chromic-sulfuric acid solution which comprises heating the crude anthraquinone with a caustic soda solution, agitating the mixture and continuing the heating and agitation to bring about solution of soluble impurities, filtering the resulting solution from undissolved anthraquinone, and washing the anthraquinone with a further amount of caustic soda solution.

In testimony whereof I affix my signature.

HARRY F. LEWIS.